United States Patent Office 2,969,303
Patented Jan. 24, 1961

2,969,303
COMBATING INSECTS

Roy E. Stansbury and Lyle D. Goodhue, Bartlesville, Okla., assignors to Phillips Petroleum Company, a corporation of Delaware No Drawing. Filed Nov. 15, 1957, Ser. No. 696,630

6 Claims. (Cl. 167—22)

This invention relates to combating of insects such as flies, etc. In one of its aspects, the invention provides a method and composition, for combating insects by knocking them down and/or by killing them, based upon the use of di-n-butyl sulfone

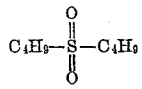

in composition with at least one compound selected from the group consisting of N-alkyl imides of bicyclo[2.2.1]-5-heptene-2,3-dicarboxylic acid; and alkyl 3-(3,4-methylenedioxybenzene) propyl sulfoxides.

The N-alkyl imides of bicyclo[2.2.1]-5-heptene-2,3-dicarobxylic acid can be represented by the formula

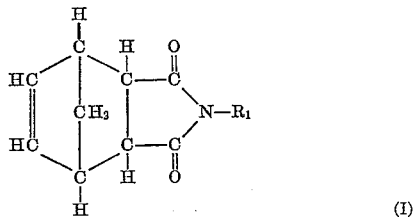

wherein $R_1$ is an alkyl radical containing not more than 12 carbon atoms.

The alkyl 3-(3,4- methylenedioxybenzene)propyl sulfoxides can be represented by the formula

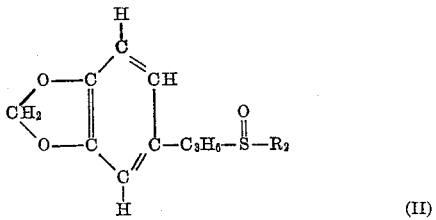

wherein $R_2$ is an alkyl radical containing from two to twelve carbon atoms inclusive.

In another aspect, the invention relates to such a method and composition in which additionally there is used in the composition of the invention a third ingredient which is toxic to insects.

Insecticidal mixtures are widely used to control flies, roaches and other insects. The field of insecticides is divided broadly into two classifications, agricultural insecticides and household insecticides. While the primary purpose of both of these types of insecticides is to kill the insect, other properties are also desirable, particularly in the household variety of insecticides. For example, the housewife is particularly interested in obtaining an insecticide which will quickly cause knockdown (paralysis) of flies, etc., even though the insect being attacked does not die for some period of time. The most widely used agent in insecticides which causes knockdown of flies and other insects is pyrethrum. However, pyrethrum is an extremely expensive item, and even though very small amounts of this material are employed, it is advantageous from an economic standpoint to reduce or eliminate pyrethrum from insecticidal mixtures if such can be done without decreasing the rate of knockdown. It is disclosed in copending application Serial No. 632,271 of Stansbury et al., filed January 3, 1957, that di-n-butyl sulfone is an active knockdown agent or insecticide, depending upon the concentrations employed.

It is an object of this invention to provide a method and composition for combating insects. Another object is to provide a method and composition for improved knockdown and paralytic knockdown of insects. A further object is to provide a composition possessing the improved knockdown qualities mentioned, although expensive pyrethrum is not present in the composition.

Other aspects, objects and the advantages of the invention are apparent from this specification, the examples in it and from the appended claims.

It has now been discovered that mixtures of di-n-butyl sulfone with a material selected from the group consisting of N-alkyl imides of bicyclo[2.2.1]-5-heptene-2,3-dicarbocylic acid, and the alkyl 3-(3,4-methylenedioxybenzene)propyl sulfoxides are extremely effective agents for causing knockdown of insects, said compositions also being very effective insecticides when utilized in admixture with a third toxic ingredient.

The ratio of the imide and/or sulfoxide compound selected from the above-mentioned group to the di-n-butyl sulfone usually will be within the range between 10:1 and 0.5:1, preferably between 5:1 and 1:1, all ratios being expressed on a weight basis. Mixtures of two or more of the compounds of the group can be used within the scope of the invention and can present certain economic and other advantages as will be apparent to one reading this disclosure. When utilizing a third toxic ingredient in combination with these mixtures, usually from 2 to 5 parts of said mixture (or "knock-down" agent) per part by weight of toxic ingredient is preferred, although from 0.5 to 10 parts of said mixture per part by weight of toxic ingredient can be present in the composition which is being sprayed in, or applied in another manner to, a location in which it is desired to kill insects. Other ratios can be employed. The compositions of this invention can be used in any of the forms in which knockdown agents or insecticides are commonly employed. As in the case of practically all of the knockdown agents, the compositions are preferably applied in the form of a space spray, that is, are sprayed or atomized into a confined area in which insects are present. In such a method of application, the active ingredients of the compositions of this invention are normally utilized in the form of solutions, although emulsions can be employed. When employing the compositions of this invention in solution in such materials as deodorized kerosene, a practical lower limit for the concentration is 0.002 gram per cubic centimeter of liquid solvent. When applying these materials in the form of space sprays, sufficient solution, emulsions, or the like, should be employed so as to provide a concentration of at least .03 gram per 100 cubic feet of space into which the material is being applied; the compositions can also be applied to surfaces and about 2 to 5 grams of active ingredients per 100 square feet will yield acceptable results. Higher and lower ratios or amounts, though employable, are not presently preferred.

Thus, according to the present invention there have been provided a method and composition for combating insects as herein described, the method comprising applying to the space or area at which the insect may be present a composition containing di-n-butyl sulfone and at least one compound selected from the said imides, said sulfoxides and said substituted methylenedioxybenzenes, with or without a third toxic ingredient such as set forth herein, Some examples of the N-alkyl imides of bicyclo[2.2.1]-5-heptene-2,3-dicarboxylic acid include N-methylbicyclo[2.2.1] - 5 - heptene - 2,3 - dicarboximide; N - ethylbicyclo[2.2.1]-5-heptene-2,3-dicarboximide; N - isopropylbicyclo[2.2.1]-5-heptene-2,3-dicarboximides; N - 2 - ethylhexylbicyclo[2.2.1]-5-heptene-2,3-dicarboximide; N - t - dodecylbicyclo[2.2.1]-5-heptene-2,3-dicarboximide; N - isoheptylbicyclo[2.2.1]-5-heptene-2,3-dicarboximides; N - t - butylbicyclo[2.2.1]-5-heptene-2,3-dicarboximide; N - 3-propyloctylbicyclo[2.2.1]-5-heptene-2,3-dicarboximide; and N-2,3-dimethyldecylbicyclo[2.2.1]-5-heptene - 2,3-dicarboximide.

Representative examples of alkyl 3-(3,4-methylenedioxybenzene)propyl sulfoxides include ethyl 3-(3,4-methylenedioxybenzene)propyl sulfoxide, propyl 3-(3,4-methylenedioxybenzene)propyl sulfoxide, t-butyl 3-(3,4-methylenedioxybenzene)propyl sulfoxide, n-hexyl 3-(3,4-methylenedioxybenzene)propyl sulfoxide, n-octyl 3-(3,4-methylenedioxybenzene)propyl sulfoxide, n-dodecy 3-(3,4-methylenedioxybenzene)propyl sulfoxide, 3-butyloctyl 3-(3,4-methylenedioxybenzene) propyl sulfoxide, 2-ethylpentyl 3-(3,4-methylenedioxybenzene)propyl sulfoxide, and 3-methylhexyl 3-(3,4-methylenedioxybenzene)propyl sulfoxide.

Some examples of a third toxic ingredient which can be employed in conjunction with the di-n-butyl sulfone and a material selected from the above-mentioned group are: 1,1,1-trichloro-2,2-bis(p-chlorophenyl)ethane (DDT), 1,1,1-trichloro-2,2-bis(p-methoxyphenyl)ethane (Methoxychlor), the gamma isomer of 1,2,3,4,5,6-hexachlorocyclohexane (Lindane), Malathion O,O-dimethyl dithiophosphate of diethylmercaptosuccinate and the like.

Some examples of solvents which can be employed when it is desired to apply the compositions of this invention in the form of solutions are: kerosene, naphthas, isoparaffinic hydrocarbons, toluene, cyclohexanone, acetone and the like. It is also within the scope of this invention to employ mixtures of solvents as for example, dissolving the materials of the compositions of this invention in cyclohexanone and thereafter dissolving the thus-formed solution in deodorized kerosene until the desired concentration of active ingredients in solvent is reached. Two preferred solvents are deodorized kerosene such as a kerosene material which has been deodorized by steam stripping and having a boiling point within the range between 385 and 500° F. and the isoparaffinic hydrocarbon fraction boiling within the range between 260 and 800° F. which has been prepared by the HF catalyzed alkylation of olefins and isoparaffins. Such an isoparaffinic material is sold under the trade name of Soltrol.

The knockdown and insecticide compositions of this invention are useful for knocking down or killing such insects as flies, ants, gnats, mosquitoes, roaches, and the like, although they are particularly effective when employed in compositions for knocking down and/or killing houseflies. A particularly surprising advantage of the knockdown compositions of this invention is that they paralyze the fly to a much greater extent than do either of the individual components of these compositions. For example, the N-octyl imide of bicyclo[2.2.1]-5-heptene-2,3-dicarboxylic acid will knockdown a fairly high percentage of houseflies, but the houseflies which are down as counted by the standard Peet-Grady test are not completely paralyzed, since they can be seen to move about on the floor of a test chamber. In fact, less than 5 percent of the flies which are down are in a completely paralyzed state. The same may be said for di-n-butyl sulfone, although a higher percentage of flies are knocked down, and a higher percent of those down are completely paralyzed. However, even with this material the number of flies completely paralyzed represents less than 20 percent of the flies down. In addition to the compositions of the present invention providing a greatly increased percentage of knockdown, they also cause a much higher percentage of the flies which are knocked down to be ompletely paralyzed.

The following examples illustrates the usefulness of the compositions of the persent invention and confirm that invention, as claimed, is operative as set forth.

EXAMPLE I

Di-n-butyl sulfone was tested for knockdown activity alone and in admixture with N-2-ethylhexyl imide of bicyclo[2.2.1]-5-heptene-2,3-dicarboxylic acid. The test procedure was carried out as follows: an amount of the chemical to be tested was dissolved in a suitable solvent, and a volume of the resulting solution was sprayed into a Peet-Grady chamber in which a known number of houseflies were contained. The Peet-Grady chamber is a chamber of 216 cubic feet capacity (6' x 6' x 6'). The number of flies knocked down, e.g., paralyzed, dead or knocked down but not paralyzed, was counted at various time intervals and the total number of flies that were dead at the end of 24 hours was determined. The results of these tests are expressed below as Table I.

Table I

| Chemical | Grams Chemical in 12 ccs. of solution [1] | Percent Knockdown in X Minutes | | | | | Percent of Flies "Down" Which Were Completely Paralyzed (at 10 minutes) | Percent Mortality After 24 Hours |
|---|---|---|---|---|---|---|---|---|
| | | 2 | 4 | 6 | 8 | 10 | | |
| N-2-ethylhexylbicyclo[2.2.1]-5-heptene-2-dicarboximide.[2] | 0.24 | 25 | 35 | 42 | 49 | 50 | 0 | 17 |
| Do [2] | 0.24 | 12 | 27 | 41 | 47 | 49 | 1 | 5 |
| Di-n-butyl sulfone | 0.048 | 33 | 60 | 66 | 78 | 78 | Not Measured | 21 |
| Do | 0.048 | 41 | 55 | 64 | 74 | 76 | 13 | 8 |
| N-2-ethylhexylbicyclo[2.2.1]-5-heptene-2-dicarboximide. | 0.24 | 54 | 73 | 83 | 87 | 89 | Not Measured | 32 |
| Di-n-butyl sulfone | 0.048 | | | | | | | |
| N-2-ethylhexylbicyclo[2.2.1]-5-heptene-2-dicarboximide. | 0.24 | 47 | 64 | 82 | 87 | 96 | 43 | 44 |
| Di-n-butyl sulfone | 0.048 | | | | | | | |

[1] The solvent used in all of these runs was a deodorized kerosene sold under the trade name of Apco 467 (Anderson-Pritchard Company).
[2] Sold under the trade name of MGK-264 (McLaughlin-Gormley-King Company).

From Table I it is noted that, although the completely paralyzed percentage for the two first runs was very low and only 13 in the fourth run, it was 43 in the last run. This clearly shows a synergistic effect of the two compounds of the fourth run when in presence each of the other.

EXAMPLE II

Another series of runs was carried out in which mixtures of di-n-butyl sulfone with the n-octyl sulfoxide of isosafrole and the carboximide of Example I were tested as knockdown agents for houseflies. In these runs, the paralytic knockdown at various time intervals was determined, and the total knockdown after 10 minutes was determined. Paralytic knockdown counts only the flies dead or completely paralyzed, while total knockdown counts paralyzed flies, dead flies, and flies which are down but are still moving about on the floor of the test chamber.

The results of these runs are expressed below as Table II. The solutions utilized in these runs were solutions of the chemical in a deodorized kerosene sold under the trade name of Apco 467.

Table II

| Chemical | Grams Chemical in 12 ccs. of Solution | Percent Paralytic knockdown in X Minutes (Avg. of 2 Runs) | | | | | Total Knockdown After 10 Minutes, Percent | Percent Mortality After 24 Hours |
|---|---|---|---|---|---|---|---|---|
| | | 2 | 4 | 6 | 8 | 10 | | |
| n-octyl sulfoxide of isosafrole [n-octyl 3-(3,4-methylenedioxybenzene) propyl sulfoxide] | 0.24 | 0 | 1 | 1 | 2 | 1 | 54 | 25 |
| Di-n-butyl sulfone | 0.048 | 1 | 3 | 6 | 8 | 11 | 82 | 8 |
| n-octyl sulfoxide of isosafrole+ | 0.24 | } 1 | 7 | 13 | 21 | 30 | 84 | 40 |
| Di-n-butyl sulfone | 0.048 | | | | | | | |
| Di-n-butyl sulfone | 0.048 | 1 | 2 | 3 | 4 | 9 | 72 | 9 |
| N-2-ethylhexylbicyclo[2.2.1]-5-heptene-2-dicarboximide | 0.24 | 0 | 0 | 0 | 0 | ¹1 | 48 | 7 |
| Di-n-butyl sulfone | 0.048 | 0 | 3 | 7 | 9 | ¹12 | 77 | 8 |
| N-2-ethylhexylbicyclo[2.2.1]-5-heptene-2-dicarboximide+ | 0.24 | } 0 | 4 | 11 | 18 | ¹27 | 85 | 28 |
| Di-n-butyl sulfone | 0.048 | | | | | | | |

¹ These values (for the entire run) are the average of 3 runs.

From Table II, it will be noted that the percent paralytic knockdown after 4, 6, 8 and 10 minutes for the compositions according to the invention consistently was considerably greater than would be the sum of the knockdowns found for each of the components used alone. Total knockdown after 10 minutes was improved.

In the following table, additional data are included. The data were obtained according to the method or procedure of Example I and II.

Table III

DI-N-BUTYL SULFONE ALONE

| Run No. | Grams of Di-n-butyl sulfone in 12 cc. of solution ¹ | Grams of MGK-264 in 12 cc. of solution | Paralytic Knockdown, Percent After 10 minutes | Total Knockdown, Percent After 10 minutes | 24 Hour Kill, Percent | Values average from X number of runs |
|---|---|---|---|---|---|---|
| 1 | 0.036 | 0 | 10 | 49 | 17 | 1 |
| 2 | 0.048 | 0 | 13 | 75 | 8 | 5 |
| 3 | 0.06 | 0 | 30 | 67 | 19 | 2 |
| 4 | 0.09 | 0 | 50 | 94 | 22 | 1 |
| 5 | 0.144 | 0 | 74 | 96 | 25 | 1 |

MGK-264 ALONE

| 6 | 0 | 0.24 | 0.7 | 40 | 19 | 6 |
| 7 | 0 | 0.36 | 3 | 29 | 46 | 2 |
| 8 | 0 | 0.48 | 0 | 20 | 7 | 2 |

COMBINATION OF MGK-264 AND DI-N-BUTYL SULFONE

| 9 | 0.048 | 0.24 | 27 | 85 | 28 | 3 |
| 10 | 0.06 | 0.24 | 45 | 86 | 42 | 4 |
| 11 | 0.09 | 0.36 | 60 | 97 | 44 | 2 |

¹ The solvent for the above runs was deodorized kerosene (APCO 467).

Reasonable variation and modification are possible within the scope of the foregoing disclosure and the appended claims to the invention, the essence of which is that N-alkyl imides of bicyclo[2.2.1]-5-heptene-2,3-dicarboxylic acid and/or 3-(3,4-methylenedioxybenzene) propyl sulfoxides as set forth have been found to exhibit synergistic paralytic knockdown with di-n-butyl sulfone and that a method and a composition for combating insects which embody this concept have been set forth as described.

We claim:

1. An insect combating composition comprising di-n-butyl sulfone and n-octyl 3-(3,4-methylenedioxybenzene) propyl sulfoxide, the composition comprising said compounds in concentrations of 0.048 gram and 0.24 gram to 12 cc. of solution, respectively.

2. An insect combating composition comprising di-n-butyl sulfone and N-2-ethylhexylbicyclo[2.2.1]-5-heptene-2-dicarboximide, the said compounds in concentrations of 0.048 gram and 0.24 gram to 12 cc. of solution, respectively.

3. A method of combating an insect which comprises contacting said insect with di-n-butyl sulfone and n-octyl 3-(3,4-methylenedioxybenzene)propyl sulfoxide, the said compounds in concentrations of 0.048 gram and 0.24 gram to 12 cc. of solution, respectively.

4. A method of combating an insect which comprises contacting said insect with di-n-butyl sulfone and N-2-ethylhexylbicyclo[2.2.1]-5-heptene-2-dicarboximide, the said compounds in concentrations of 0.048 gram and 0.24 gram to 12 cc. of solution, respectively.

5. An insect combating composition comprising di-n-butyl sulfone and N-2-ethylhexylbicyclo[2.2.1]-5-heptene-2-dicarboximide, the said compounds being present in concentrations in the range 0.09–0.048 gram of di-n-butyl sulfone and 0.24–0.36 gram of N-2-ethylhexylbicyclo[2.2.1]-5-heptene-2-dicarboximide in 12 cc. of solution, respectively.

6. A method of combating an insect which comprises contacting said insect with di-n-butyl sulfone and N-2-ethylhexylbicyclo[2.2.1]-5-heptene-2-dicarboximide, the said compounds being present in concentrations in the range 0.09–0.048 gram of di-n-butyl sulfone and 0.24–0.36 gram of N-2-ethylhexylbicyclo[2.2.1]-5-heptene-2-dicarboximide in 12 cc. of solution, respectively.

(References on following page)

References Cited in the file of this patent

UNITED STATES PATENTS

| | | |
|---|---|---|
| 2,424,220 | Bousquet | July 22, 1947 |
| 2,764,517 | Beroza | Sept. 25, 1956 |

OTHER REFERENCES

Connolly: Pest Control, p. 24, May 1952.

Frear: A Catalogue of Insecticides and Fungicides, vol. I, p. 58, 1947.

King: Chemicals Evaluated as Insecticides, USDA Handbook No. 69, May 1954, pp. 85, 93.

The Lancet, vol. 2, pp. 46–50, July 8, 1950.

Sumerford: J. of Agr. and Food Chem., vol. 2, No. 6, pp. 310–327 (pp. 310–311 pert.).

Cole et al.: J. of Econ. Entomology, vol. 47, No. 3, pp. 501–505, June 1954.

Lindquist et al.: U.S.D.A., Bur. of Ent. and Plant Quar., E-775, pp. 1–4 and 19, April 1949.